(No Model.)

G. A. WELD.
SHANK STIFFENER.

No. 501,978. Patented July 25, 1893.

WITNESSES.
Frank G. Parker.
Matthew M. Blunt.

INVENTOR.
George A. Weld

UNITED STATES PATENT OFFICE.

GEORGE A. WELD, OF WINCHESTER, MASSACHUSETTS.

SHANK-STIFFENER.

SPECIFICATION forming part of Letters Patent No. 501,978, dated July 25, 1893.

Application filed March 28, 1892. Serial No. 426,664. (No model.)

*To all whom it may concern:*

Be it known that I, GEORGE A. WELD, of Winchester, in the county of Middlesex and State of Massachusetts, have invented certain new and useful Improvements in Shank-Stiffeners, of which the following, taken in connection with the accompanying drawings, is a specification.

Figure 1:
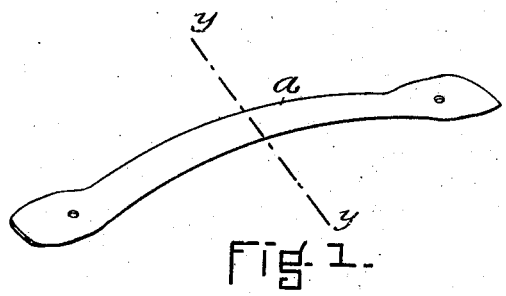
Figure 2:
Figure 3:
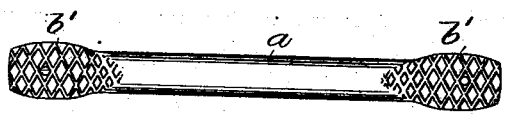

Figure 1, is a perspective view of my improved shank stiffener embodying my invention. Fig. 2, is a cross section of the shank stiffener shown in Fig. 1, taken on dotted lines $y$—$y$. Fig. 3, is a plan of the under side of the shank.

This invention pertains to spring shanks, so-called, for boots or shoes, in which a thin metallic plate or shank stiffener is employed and is secured upon the shank part of the sole of the boot or shoe to give greater elasticity and strength to the latter at this particular point,—the shank.

$a$, represents the upper or flat side of the shank stiffener after it is curved longitudinally and flattened or embossed at the ends; $b$, the curve of the under side of the shank stiffener, and $b'$ $b'$, the under side of the flattened or embossed ends of the shank stiffener.

My invention consists in the particular form of the shank stiffener and is made from what is known as half-oval steel wire, coiled at the wire mill when hot so as to give the required curve and temper to the shank stiffener when it is cut from the coil of wire. This enables me to do away with the expensive process of hardening and tempering after the flattened or embossed ends are made and the shank cut off and punched as it retains its original curve as when in the coil, and when placed in the shank of the shoe it will give the desired shape or curve to the shank part of the shoe. By placing the half oval form upon the outside *i. e.* downward, and by embossing or flattening the ends, and by making the upper part, which contacts with the shoe shank practically flat, I obtain great strength at the essential point needed, and a fit and wear not obtainable I believe by any other form of steel stiffener.

My improvement consists in using what is known as half-oval wire, either spring or malleable, flattened or embossed at a given point as the wire passes through the embossing machine. It next comes in contact with the punching and cutting die operated by the same machine, which punches the attaching holes in the shank and cuts the shank off midway on the embossment at the same time. It will be seen by producing a shank from stock of this shape an extra stiffness is obtained through the center of the shank stiffener, which is the desired point, and also lessens the amount of filling necessary in the shank of a boot or shoe, as the half-oval side of the shank stiffener fills out the leather part of the shank to the desired curve.

It will be understood that my improved shank stiffener is designed to be employed on the bottom surface of the shank with the flat or plain surface of the stiffener resting against and conforming to the said bottom surface of the shank. The ends of the shank stiffener are flattened and thinned in order that the ends of the stiffener may, as it were, merge with the surface of the shank without abrupt terminations, and so that both surfaces of the portions extending into the heel and sole will have surfaces conforming to the form of both surfaces with which they come into contact.

What I claim is—

A shank stiffener for boots and shoes having its central portion of plano-convex form in cross section, and its ends flattened and thinned, substantially as and for the purpose described.

In testimony whereof I have signed my name to this specification, in the presence of two subscribing witnesses, on this 25th day of March, A. D. 1892.

GEORGE A. WELD.

Witnesses:
FRANK G. PARKER,
MATTHEW M. BLUNT.